Figure 1:
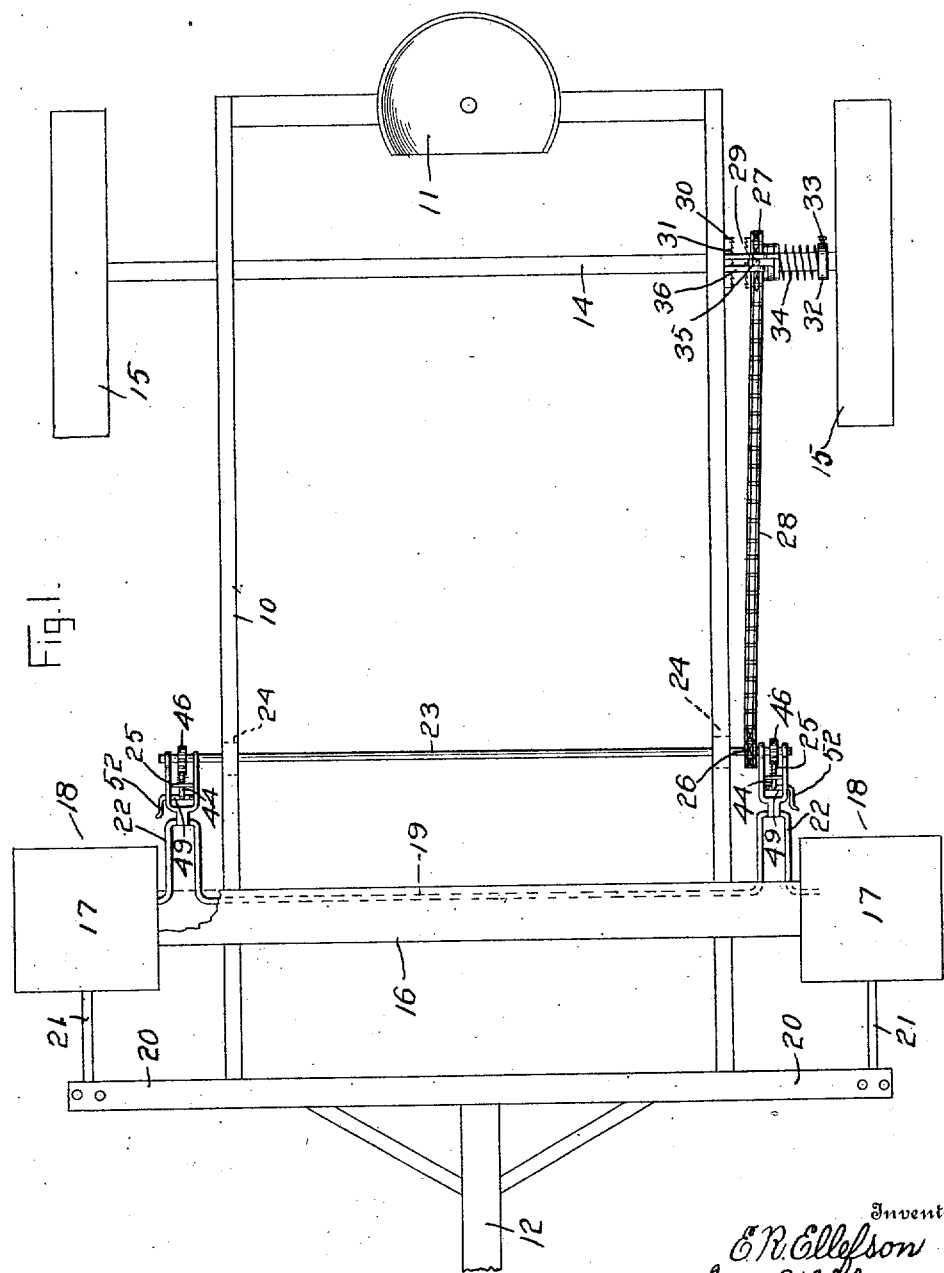

No. 874,313. PATENTED DEC. 17, 1907.
E. R. ELLEFSON & L. IHLAN.
CORN PLANTER.
APPLICATION FILED JULY 31, 1907.

3 SHEETS—SHEET 1.

Witnesses
Inventors
E. R. Ellefson
and L. Ihlan
By
Attorneys

No. 874,313. PATENTED DEC. 17, 1907.
E. R. ELLEFSON & L. IHLAN.
CORN PLANTER.
APPLICATION FILED JULY 31, 1907.
3 SHEETS—SHEET 2.
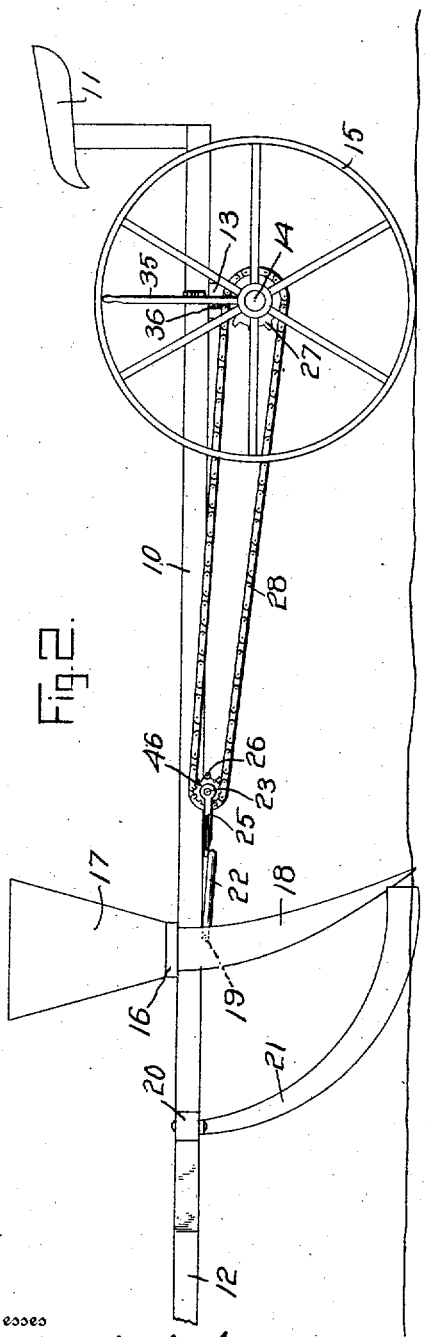
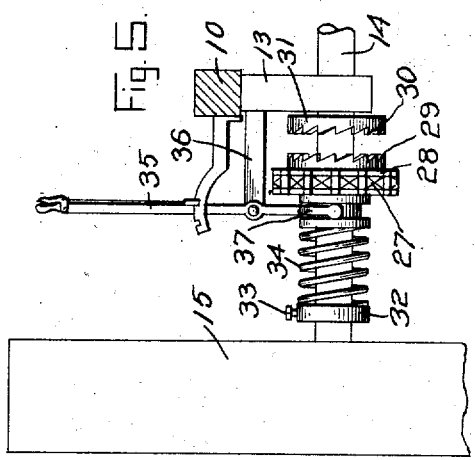

No. 874,313. PATENTED DEC. 17, 1907.
E. R. ELLEFSON & L. IHLAN.
CORN PLANTER.
APPLICATION FILED JULY 31, 1907.
3 SHEETS—SHEET 3.
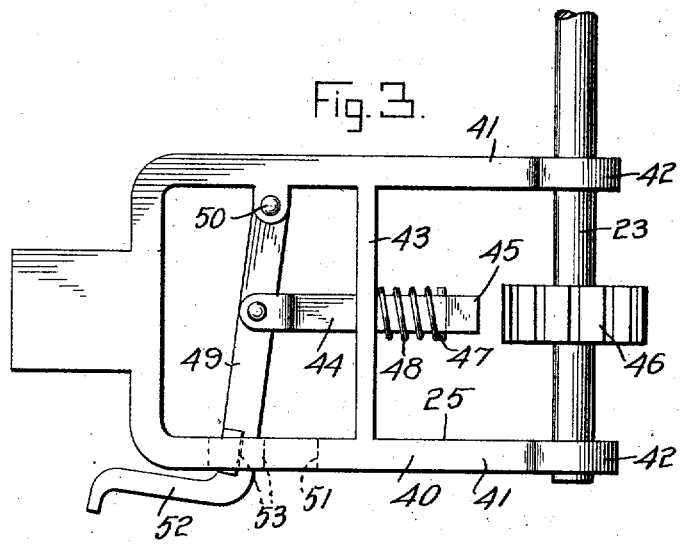
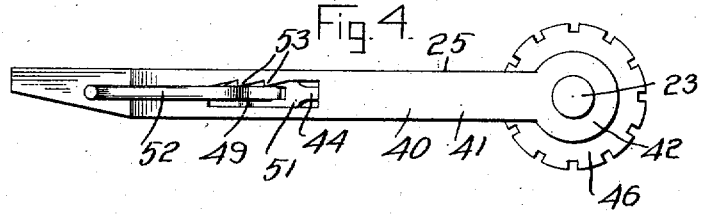
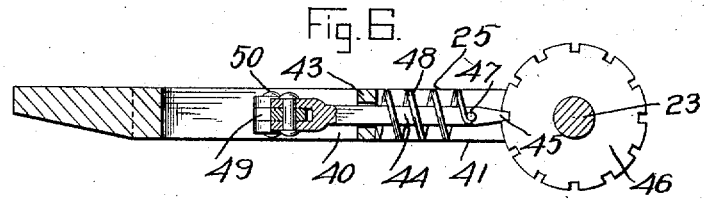
Witnesses
Inventors
E. R. Ellefson
and L. Ihlan
By Chandler & Chandler
Attorneys

UNITED STATES PATENT OFFICE.

ELERT R. ELLEFSON AND LOYD IHLAN, OF HARDWICK, MINNESOTA.

CORN-PLANTER.

No. 874,313.　　　　Specification of Letters Patent.　　　　Patented Dec. 17, 1907.

Application filed July 31, 1907. Serial No. 386,368.

*To all whom it may concern:*

Be it known that we, ELERT R. ELLEFSON and LOYD IHLAN, citizens of the United States, residing at Hardwick, in the county of Rock, State of Minnesota, have invented certain new and useful Improvements in Corn-Planters; and we do hereby declare the following to be a full, clear, and exact description of the invention, such as will enable others skilled in the art to which it appertains to make and use the same.

This invention relates to new and useful improvements in corn planters and it has particular reference to a corn planter in which mechanical means operated from the drive wheels are employed to actuate the feeding mechanism, thereby eliminating the necessity of the usual check row wire.

In connection with a corn planter of the above general type, the invention aims as a primary object to provide a novel construction, combination and arrangement of parts, the details of which will appear in the course of the following description, in which reference is had to the accompanying drawings forming a part of this specification, like characters of reference designating similar parts throughout the several views, wherein:

Figure 1 is a top plan view of a corn planter constructed in accordance with the present invention. Fig. 2 is a side elevation thereof. Fig. 3 is an enlarged plan view of the feeder actuating mechanism. Fig. 4 is a side elevation of such mechanism. Fig. 5 is a rear end elevation of one side of the machine. Fig. 6 is a central longitudinal section of the feeder actuating mechanism.

In the accompanying drawings, the numeral 10 designates a rectangular frame from the rear of which is supported a driver's seat 11 and from the front of which a tongue 12. Depending from the rear portions of the side bars of the frame 10, are bracket bearings 13 which support a transverse shaft or axle 14, the latter carrying on its ends the traction wheels 15. At the forward end of the side bars of said frame a cross piece 16 is provided which projects on each side and carries the seed boxes 17 communicating with conductors 18, and containing any conventional agitating mechanism operated by connections from a rock shaft 19, the latter being journaled in the said side bars. Projecting from the front ends of the side bars 10, are lateral extensions 20 from which depend the rearwardly and downwardly inclined furrow openers 21 of usual construction. The shaft 19 is provided at each side thereof with radially projecting arms 22. Rearwardly of the shaft 19, a transverse shaft 23 is supported in bearings 24, and the shaft 23 carries at each end actuating mechanism 25 which co-operates with the arms 22 to rock the shaft 19 and actuate the feeding mechanism above referred to. The shaft 23 is designed to be continuously rotated from the shaft or axle 14 and towards this end the shaft 23 carries at one side thereof and beyond the frame 10, a sprocket wheel 26 and the shaft or axle 14 carries a sprocket wheel 27, a chain 28 being employed as the connecting element.

The sprocket wheel 27 is formed at one side thereof with clutch teeth 29 which are designed to interlockingly engage similar teeth 30 on a collar 31 held rigidly upon the shaft or axle 14. At the outer side of the sprocket wheel 27 is a collar 32 which is held fast by a set screw 33. Between the collar 32 and the sprocket 27, an expansive coil spring 34 surrounds the shaft or axle 14, the function of this spring being to force the sprocket wheel 27 inwardly so that its clutch teeth 29 will engage the clutch teeth 30. The tension of the spring 34 is regulated by the position of the collar 32 with relation to the shaft or axle 14 as will be readily understood. A lever 35 is pivoted to a bracket 36 and at its lower end is formed with a suitable yoke 37 which engages the hub of the sprocket wheel 27. The lever 35 is provided in order that the sprocket wheel 27 may be moved at option out of gear with the collar 31 so as to throw the driving mechanism out of operation.

The actuating mechanism 25 is illustrated more particularly in Figs. 3, 4 and 6 and comprises a member 40 formed to impinge the arms 22 at each revolution of the shaft 19. The member 40 is constructed with parallel projecting arms 41 which at their ends are formed with collars 42 loosely surrounding the shaft 23. Between the arms 41, is a transverse cross piece 43 through which a locking pin 44 has movement. The pin 44 has its inner end sharpened to an edge as at 45 for engagement between the teeth of a cog wheel 46 carried by the shaft 23, between the arms 41. The pin 44 likewise carries a stop pin 47 between which and the cross piece 43 an expansive coil spring 48 is interposed, the function of the spring 48 being to hold the pin 44 normally in engagement with the teeth of the wheel 46. The pin 44 has pivotal connection with a lever 49 and the latter, is in turn, pivoted as at 50, to a lug carried by one of the arms 41. The other of said arms is constructed with a longitudinal slot 51 through which the lever 49 projects, said lever terminating in an angular handle 52. The slot 51 has its upper edge formed with teeth 53 in order that the lever 49 may engage said teeth as shoulders and thus be held in selected positions. It will thus be apparent that the actuating mechanisms 25 may be adjusted pivotally with relation to the shaft 23 when it is desired to start planting at determinate positions. It will be further apparent that when the arms 44 are disengaged from the wheel 46, the member 40 hangs idle from the shaft 23.

When the arm 44 is engaged with the wheel 46, the mechanism, as an entirety, rotates with the shaft 23 and impinges the respectively adjacent arm 22 at each revolution of the shaft 23. It will be understood that when the shaft 19 is rocked in this manner, the feeding mechanism within the boxes 17 is actuated to permit the egress of seeds through the conductors 18.

The invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. In a mechanism of the type set forth, the combination with a frame and seed dropping mechanism including a rock shaft having projecting arms, of a transverse shaft supported from said frame, driving means therefor, and mechanism for engagement with said arms comprising members hung from said transverse shaft and manually operated means for engaging said members with said transverse shaft for rotation therewith and for disengaging said members from said transverse shaft, whereby said members may hang idle without rotation.

2. In a mechanism of the type set forth, a wheeled frame, seed dropping mechanism, including a rock shaft having projecting arms, a transverse shaft, means for driving said transverse shaft, mechanism carried by said transverse shaft for engagement with said projecting arms to rock said rock shaft, said mechanism comprising plates having parallel arms formed to surround said transverse shaft, cog wheels carried by said transverse shaft between respective pairs of said arms, a slidable spring pressed stem supported between said arms for engagement between the teeth of said cog wheels and the lever having connection with said stem to move the latter out of engagement with said cog wheels.

In testimony whereof, we affix our signatures in presence of two witnesses.

ELERT R. ELLEFSON.
LOYD IHLAN.

Witnesses:
  JAY A. KEMMERTT,
  H. W. BERTRAM.